(No Model.)

D. K. JACKMAN.
NUT LOCK.

No. 434,933.  Patented Aug. 26, 1890.

WITNESSES
Harry King
Allison W. Jackman

INVENTOR
David K. Jackman
By Irving Uhug
Attorney

UNITED STATES PATENT OFFICE.

DAVID K. JACKMAN, OF POUGHKEEPSIE, NEW YORK.

NUT-LOCK.

SPECIFICATION forming part of Letters Patent No. 434,933, dated August 26, 1890.

Application filed May 16, 1890. Serial No. 352,064. (No model.)

*To all whom it may concern:*

Be it known that I, DAVID K. JACKMAN, a citizen of the United States, residing at Poughkeepsie, in the county of Dutchess and State of New York, have invented certain new and useful Improvements in Nut-Locks; and I do hereby declare the following to be a full, clear, and exact description of the invention, such as will enable others skilled in the art to which it appertains to make and use the same.

My invention relates to nut-locks in which a single piece of sheet metal is placed like a washer around the bolt beneath the nut and bent to form a spring-flange for engaging with the nut to hold it to place. The difficulty encountered in the use of such nut-locks hitherto has been either that they were expensive to make or that they were inefficient or insecure, or that the shape of the spring-flange was such that a quick and easy readjustment of the nut was not possible, and in such nut-locks, usually, this readjustment weakens the metal very seriously by reason of the short bend of the metal. The object of my improvement is to overcome these several disadvantages and to construct a nut-lock which shall at once be inexpensive to make, be secure, and be easily adjusted to take up the wear of the nut and bolt without materially weakening the nut-lock spring itself. I accomplish this by the device illustrated in the accompanying drawings, in which—

Figure 1:
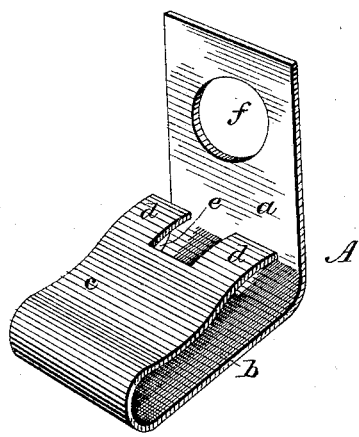
Figure 2:
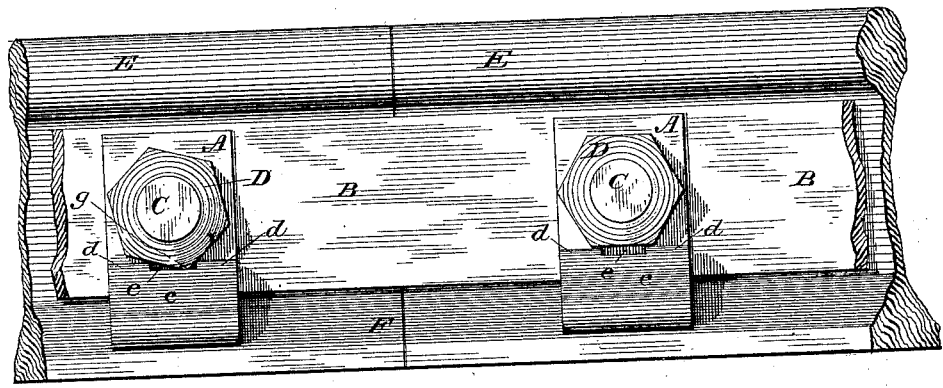
Figure 3:
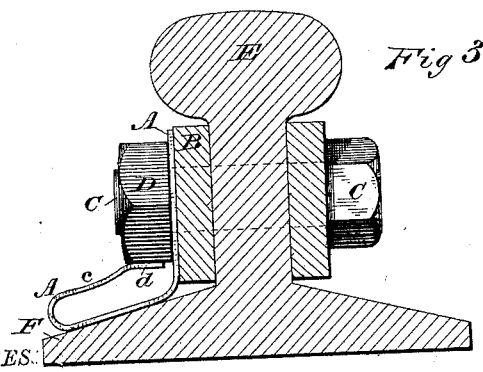

Figure 1 represents a perspective view of my nut-lock apart from bolt or nut. Fig. 2 is a side elevation showing two of my nut-locks in place upon the bolts and nuts passing through a fish-plate for holding two railroad-rails together, and showing the operation of the nut-lock upon the nut in two different positions; and Fig. 3 is a vertical cross-section of Fig. 2, showing relative positions of bolt, rail, fish-plate, locking device, and nut as used at the junction of railroad-rails.

Similar letters refer to similar parts throughout the several views.

A represents my nut-locking device, consisting of a single piece of sheet metal, preferably the best steel, and having the washer-like face $a$, with bolt-hole $f$, the lower lip $b$ resting against the rail or fish-plate, the upper lip $c$ forming a spring-loop with $b$, and having the slot $e$ and the engaging edges $d\ d$ for bearing against the nut, as shown in Fig. 2.

B represents a fish-plate; C C, bolts; D D, nuts screw-threaded to fit on the bolts.

E represents the upper part of the rail, and F the lower part or base.

The application of my nut-lock to railroad-rails is shown in the drawings, as it represents one of the most important uses to which a nut-lock may be put; but it is applicable to any position where a nut-locking device is serviceable, and for the purpose of applying it to use where the bolts pass through wood, as in bridge-building, the two upper corners of the washer $a$ may be bent at right angles to the plane of $a$ and driven into the wood to keep A from turning when drawn to its place.

In the application of my nut-lock to railroad-rails my spring-flanges need to be somewhat differently proportioned, according to the style of fish-plate used. The fish-plate shown in the drawings is one of the old style and does not project over the lower edge F of the rail, as do most of the fish-plates now manufactured. When used, therefore, with the new style of fish-plate, the lips $b$ and $c$ of my nut-lock would necessarily be somewhat nearer together than is shown in the drawings to allow the fish-plate flange to lie between $b$ and F. $a$ would likewise need to be the width of the fish-plate flange shorter than is shown in the drawings between the bolt-hole $f$ and the lower lip $b$; but in no case will it be necessary to have the loop of the spring extend beyond the edge of the fish-plate flange, and with the use of the old style of fish-plate the loop need not extend as far as the edge of the base of the rail. The slot $e$ in the upper lip of the spring serves to permit the secure locking of the nut when it is only possible to turn it a very little—less than one-sixth of a revolution in the case of a hexagonal nut, as shown in Fig. 2. This provides for the taking up of the slightest wear.

For the convenient adjustment of my nut-lock I form the upper spring-flange $c$ with a depression midway between the outer bend and the inner nut-locking ends $d\ d$. The ordinary bolt is long enough to project over the inner portion of this spring-flange depression, thus permitting the thread of the nut to engage with the thread of the bolt without any downward pressure upon c, which it would be difficult to give before the nut was attached to the bolt. After being thus started, so that a wrench may be used to turn the nut to place, a workman may readily depress the flange c by the natural movement of the wrench, so that the flange ends d d clear the nut as he turns it to its place. In the same convenient way he may take up the wear of the bolt and plate, or by reversing remove the nut entirely without injuring the action of the nut-lock, which is the means both of saving time in the examination of rails on a railway and of saving money, which would, with the ordinary nut-lock, have to be expended for renewing broken or weakened metal.

I am aware that there are other nut-locks somewhat similar to this in their application as a metal washer encircling the bolt and lying underneath the nut; but in all these the application of the spring in its bearing upon the nut is essentially different from mine, some having flanges for bending out flatly against the side of the nut. These forms I disclaim, and I also specially disclaim the form of perforated washer shown in the patent issued to T. D. Jones November 12, 1889, No. 415,043, which consists of a metal brace rigidly fixed between the side of a nut and a flange opposite to it, as this brace defeats the two main purposes of my invention—viz., easy readjustment of the nuts and the avoidance of breakage of the nut-lock, even with indefinitely-repeated use.

The gist of my invention lies in the use of a washer having a spring-loop between the rail or fish-plate and the nut long enough to admit of repeated adjustments without affecting the integrity of the metal and short enough to exert sufficient pressure against the nut to preclude any chance of displacement of the nut by jarring or accidental knocking.

What I claim, therefore, and desire to secure by Letters Patent, is—

1. A nut-lock consisting of a washer adapted to fit over the bolt and constructed with a loop-shaped spring having a lower and an upper flange, the latter containing a slot in the center of its inner face, whereby the nut may be securely locked with the dropping of one of its angles into this slot and the slightest possible wear of the bolt be taken up, substantially as set forth.

2. A nut-lock A, formed from a single piece of metal and consisting of a washer a, having a bolt-hole f, a lower lip b, and an upper lip c, depressed between its outer loop and its inner locking-surface d to permit the convenient adjustment of the nut upon the end of the bolt, as and for the purpose specified.

3. The combination of a rail, a fish-plate, a threaded bolt passing through both rail and fish-plate, a nut correspondingly threaded upon the bolt, the projecting flange of the rail or fish-plate, and a nut-lock consisting of a washer to fit over the bolt and under the nut and constructed with a loop-shaped spring having a lower portion b resting upon the rail or fish-plate flange and an upper portion c, engaging at its inner free end d with the nut, substantially as and for the purpose described.

In testimony whereof I affix my signature in presence of two witnesses.

DAVID K. JACKMAN.

Witnesses:
IRVINE ELTRIL,
C. W. H. ARNOLD.